(12) United States Patent
Luik et al.

(10) Patent No.: US 6,974,182 B2
(45) Date of Patent: Dec. 13, 2005

(54) DEVICE AND METHOD FOR FASTENING A CEILING COVERING ON A MOLDED CEILING ELEMENT

(75) Inventors: Klaus Luik, Muehlacker (DE); Gerhard Reder, Moensheim (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 10/786,154

(22) Filed: Feb. 26, 2004

(65) Prior Publication Data
US 2004/0239152 A1 Dec. 2, 2004

(30) Foreign Application Priority Data
Feb. 26, 2003 (DE) .............................. 103 08 082

(51) Int. Cl.⁷ ............................................. B60R 13/02
(52) U.S. Cl. ..................................................... 296/214
(58) Field of Search ........................................ 296/214

(56) References Cited

U.S. PATENT DOCUMENTS

| | | | | |
|---|---|---|---|---|
| 3,195,948 A | * | 7/1965 | Sturtevant et al. | .......... 296/214 |
| 3,310,861 A | * | 3/1967 | Oddsen | ......................... 29/897 |
| 4,718,714 A | | 1/1988 | Tanino et al. | |
| 4,923,245 A | * | 5/1990 | Kuwabara | .................... 296/214 |
| 5,108,147 A | | 4/1992 | Grimm et al. | |

FOREIGN PATENT DOCUMENTS

| | | | | |
|---|---|---|---|---|
| DE | 196 41 665 | | 4/1997 | |
| GB | 638225 | * | 6/1950 | ................. 296/214 |

* cited by examiner

Primary Examiner—Dennis H. Pedder
(74) Attorney, Agent, or Firm—Crowell & Moring LLP

(57) ABSTRACT

Device for fastening a ceiling covering made of leather or imitation leather in a roof cutout for a sliding roof which is arranged in a molded ceiling element and which can be inserted in a vehicle roof, and the ceiling covering is pulled around an upright edge of the roof cutout and can be glued to the molded ceiling element, so that, also in rounded areas of the roof cutout for a sliding roof, a ceiling covering can be held which follows the course of the edge of the cutout in a contacting manner, clamping pieces are provided in these rounded corner areas which hold the ceiling covering in a pretensioned fashion by means of prongs.

10 Claims, 3 Drawing Sheets

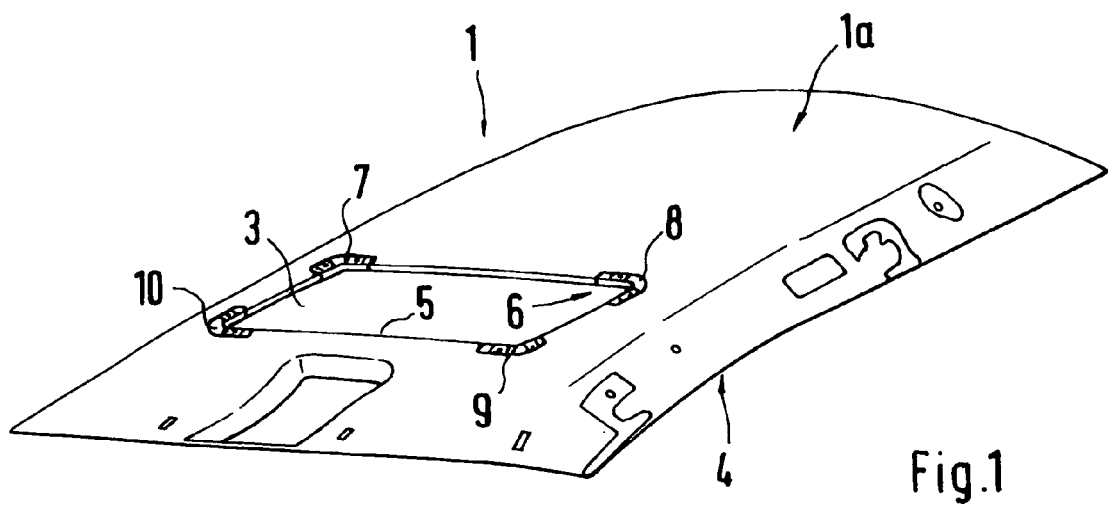
Fig. 1
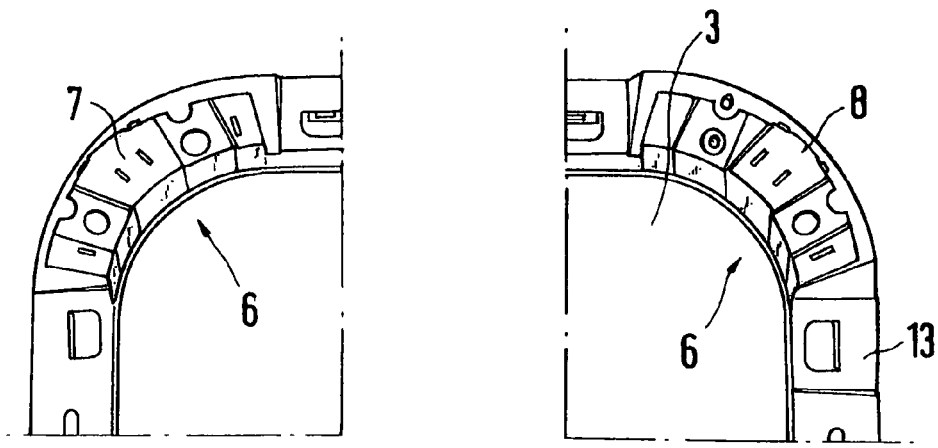
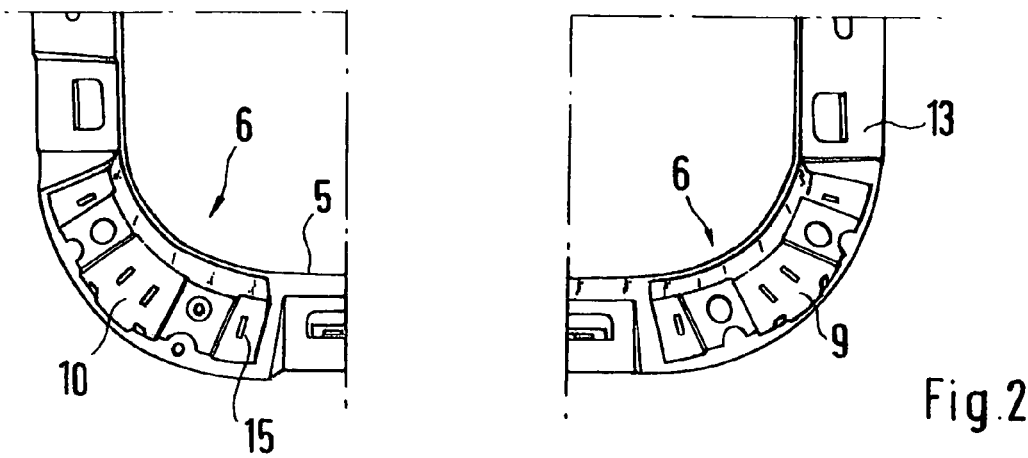
Fig. 2

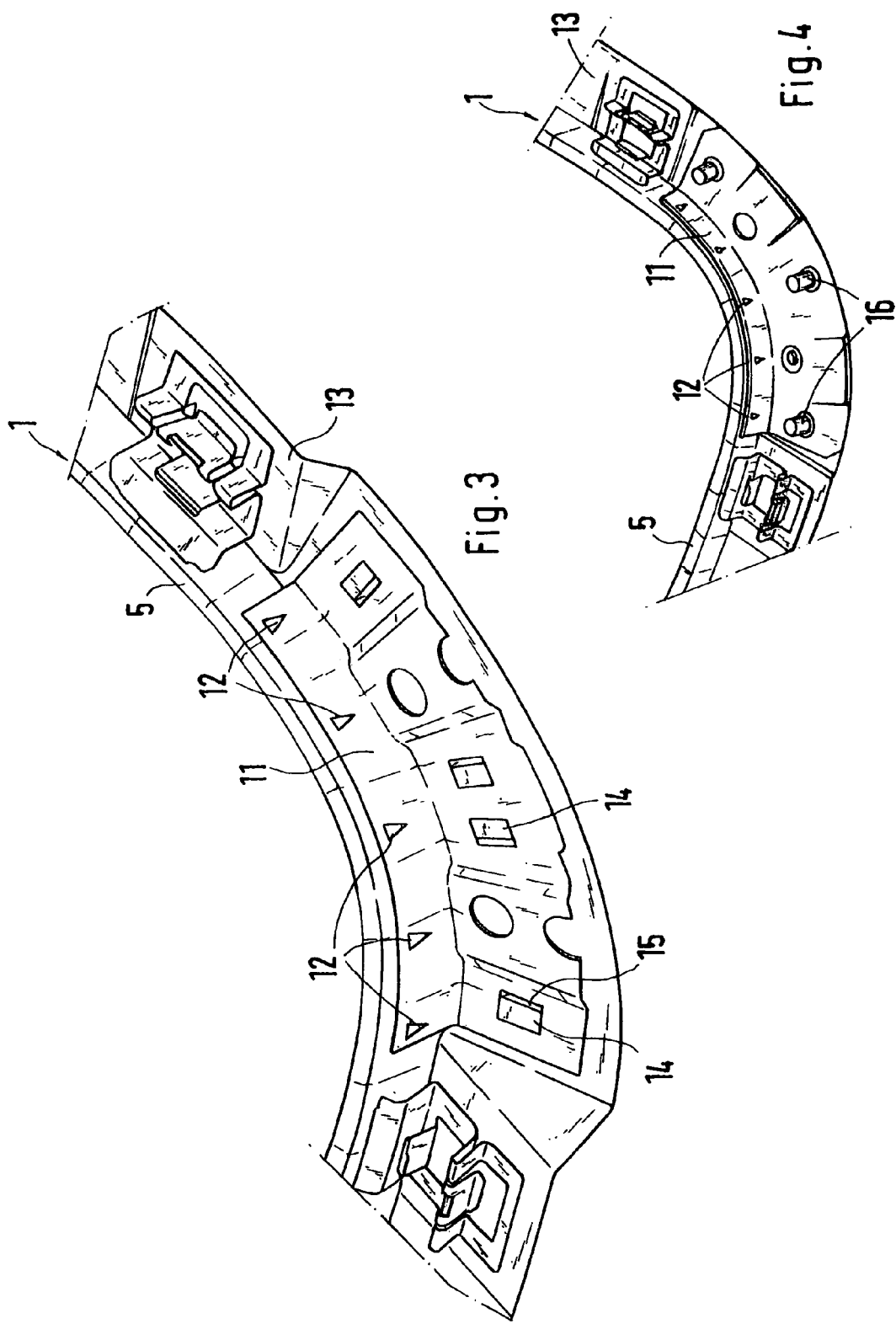

DEVICE AND METHOD FOR FASTENING A CEILING COVERING ON A MOLDED CEILING ELEMENT

BACKGROUND AND SUMMARY OF THE INVENTION

This application claims the priority of application no. 103 08 082.1 filed in Germany on Feb. 26, 2003, the disclosure of which is expressly incorporated by reference herein.

The invention relates to a device for fastening a ceiling covering. Preferred embodiments of the invention relate to a device for fastening a ceiling covering made of leather or imitation leather in a roof cutout for a sliding roof which is arranged in a molded ceiling element and which can be inserted in a vehicle roof, and the ceiling covering is pulled around an upright edge of the roof cutout and can be glued to the molded ceiling element.

From German Patent Document DE 196 41 665 A1, a clamping frame for an interior covering is known for a use in vehicles having a sliding roof. The clamping frame consists of an angle profile and has straight sections and sections rounded at the corner side, and a so-called vehicle ceiling is pulled over an upright leg of the clamping frame and is held in a clamped manner between the vehicle roof and the leg.

It is an object of the invention to provide a device for fastening a covering made of leather, imitation leather or lamination in a cutout for a sliding roof by means of which a connecting is ensured which follows the course of the edge of the cutout.

According to certain preferred embodiments of the invention, this object is achieved by a device for fastening a ceiling covering made of leather or imitation leather in a roof cutout for a sliding roof which is arranged in a molded ceiling element and which can be inserted in a vehicle roof, and the ceiling covering is pulled around an upright edge of the roof cutout and can be glued to the molded ceiling element, wherein on corners of a rounded cutout of the ceiling element, corner clamping pieces are arranged on an exterior side of the ceiling element, which corner clamping pieces consist of an angle profile, and the ceiling covering is held between an upright leg of the angle profile and an edge of the roof cutout.

Further advantageous features of preferred embodiments of the invention are described below and in the claims.

Important advantages achieved by means of certain preferred embodiments of the invention are that, a precisely fitting contact takes place on the cutout edges particularly in rounded corner areas of the molded ceiling element. This is advantageously achieved in that, on the corner side of the rounded cutout of the ceiling element, clamping pieces are arranged on the exterior side of the element, which clamping pieces consist of an angle profile, and the ceiling covering is held between an upright leg of the profile and the upright edge of the roof cutout.

So that the covering or the decor can be held in a pretensioned manner, it is provided according to certain preferred embodiments of the invention that, in its leg, the clamping piece has prongs which face the upright edge of the ceiling element and in which the decor is held following in a contacting manner the course of the cutout rounded on the corner side. The prongs on the leg of the clamping piece reach through the decor and hold it in an unchanged position, in which case the influence of heat also does not change this fastened position of the decor.

A fastening of the clamping pieces to the molded ceiling element can take place either directly or by means of a clamping frame. In certain preferred embodiments of the invention, for the fastening on the clamping frame, the clamping piece is connected with the ceiling element by means of a clamping frame which is fastened to the ceiling element and which comprises several bendable fastening lugs which are arranged to correspond with slots of the clamping piece. Furthermore, at least on a straight-extending edge area of the cutout, straight clamping pieces can be used, and clamping pieces which form approximately a quarter circle can be used at the rounded corner sections of the cutout. If required or desired, this ensures that the decor can be pretensioned also on the longitudinal and transverse sides by way of straight clamping pieces.

Other objects, advantages and novel features of the present invention will become apparent from the following detailed description of the invention when considered in conjunction with the accompanying drawings.

BRIEF DESCRIPTION OF THE DRAWINGS

FIG. 1 is a diagrammatic representation of a molded ceiling element with outlined clamping pieces, constructed according to preferred embodiments of the invention;

FIG. 2 is a top view of the clamping pieces arranged on the corner side of the cutout of the ceiling element illustrated in FIG. 1;

FIG. 3 is a diagrammatic representation showing a first embodiment of a clamping piece;

FIG. 4 is a diagrammatic representation showing a second embodiment of a clamping piece;

DETAILED DESCRIPTION OF THE DRAWINGS

Figure 5:
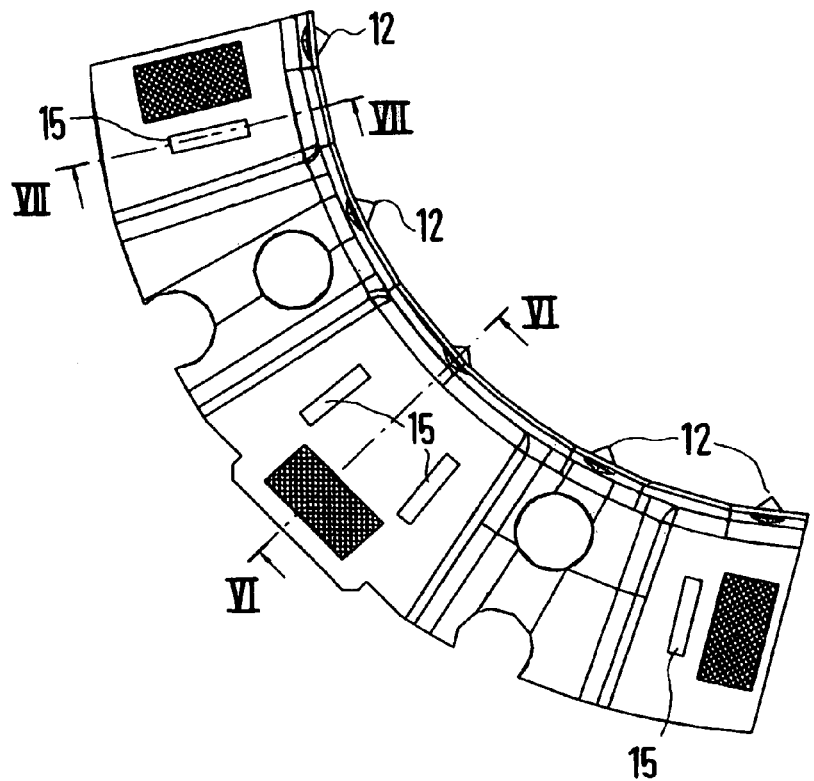
FIG. 5 is a top view of a clamping piece of the construction according to FIG. 3.
Figure 6:
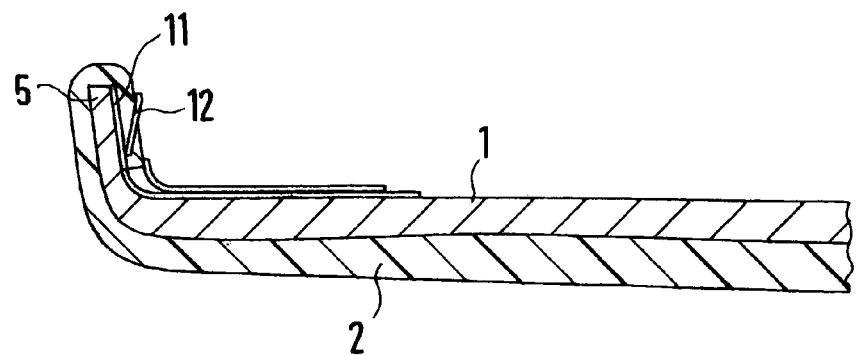
FIG. 6 is a sectional view of the clamping piece according to Line VI-VI of FIG. 5.
Figure 7:
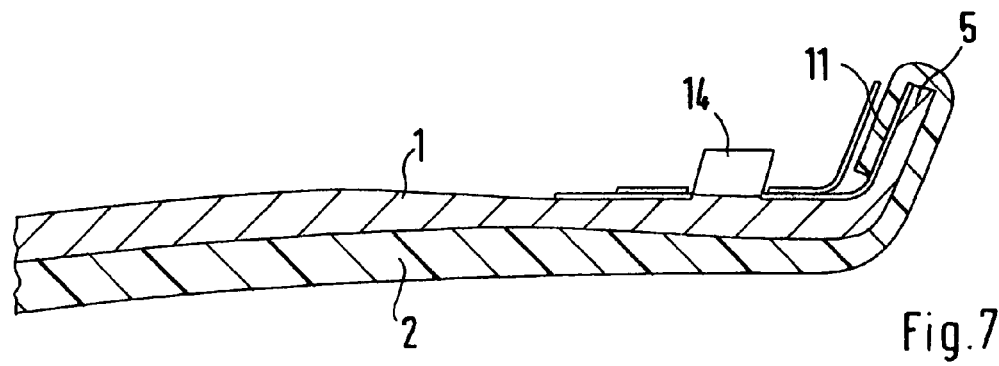
FIG. 7 is a sectional view of the clamping piece according to Line VII-VII of FIG. 5.

In a motor vehicle, a so-called molded, usually one-piece ceiling element 1 is inserted which, on the interior side, that is, in the interior of the motor vehicle, is covered by a ceiling covering 2, for example, made of imitation leather, such as ALCANTARA®, or of leather. In the case of a vehicle with a sliding roof, a cutout 3, which forms the sliding roof opening, is, in each case, provided in the roof of the vehicle body as well as in the inserted ceiling element 1.

The ceiling covering 2 covers the interior surface 4 of the ceiling element 1 and is pulled around the surrounding edge or around the surrounding upright-standing edge 5 of the cutout 3 for the sliding roof and is glued on the interior of the leg 11 on all sides.

In the rounded corner areas 6 of the cutout 3, the ceiling covering 2 is additionally held in a prestressed manner by way of clamping pieces 7, 8, 9 and 10, so that a close contact can be achieved in these corner areas 6.

For this purpose, the clamping pieces 7 to 10 have an angular construction and have a leg 11 which is situated parallel to the upright-standing edge 5 of the cutout 3, which leg 11 has prongs 12 facing the edge 5. These prongs 12 hook into the ceiling covering 2 and hold the covering 2 in a pretensioned position, so that, even under the influence of heat, no position change of the ceiling can occur in these corner areas 6, and the ceiling covering 2 is connected with the edge 5 in a pressed-on manner.

The clamping pieces 7 to 10 are either directly connected with the ceiling element 1, or are connected with a clamping frame 13 which is fastened to the ceiling element 1. A connection of the clamping pieces 7 to 10 with the clamping frame 13 preferably takes place by means of frame-side fastening lugs 14 which project into slots 15 of the clamping piece 7 to 10 and are bent over for fastening the clamping pieces 7 to 10.

According to another embodiment of FIG. 4, the clamping pieces 7 to 10 can also be fastened by means of frame-side studs 16, on which holding nuts are then placed and tightened.

If required or desired, clamping pieces can also be arranged on the longitudinal sides and transverse sides of the cutout 3 in order to exercise a certain pretensioning upon the ceiling covering 2 also in these areas. In this case, the clamping pieces will then have a straight construction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for fastening a ceiling covering made of leather or imitation leather in a roof cutout for a sliding roof which is arranged in a molded ceiling element and which can be inserted in a vehicle, the ceiling covering being pulled around an upright edge surrounding the roof cutout for gluing to the upright edge,
    wherein corner clamping pieces are arranged in rounded corner areas of the roof cutout,
    wherein each of the corner clamping pieces has an angle profile and is connected with the ceiling element by a clamping frame fastened thereto,
    wherein the ceiling covering is held over an upright leg of the angle profile and on an exterior side of the upright edge surrounding the roof cutout,
    wherein the upright leg of the angle profile of each of the respective corner clamping pieces has prongs facing the upright edge surrounding the roof cutout and holding the covering so that the covering follows in a contacting manner a course of each rounded corner area of the roof cutout, and
    wherein the clamping frame comprises several bendable fastening lugs which are arranged to correspond with slots of the corner clamping pieces.

2. Device according to claim 1, wherein a straight clamping piece is arranged at least on a straight-extending edge area of the cutout, and, at the rounded corner areas of the cutout, the corner clamping pieces approximately form quarter circles.

3. Device according to claim 1, wherein the corner clamping pieces are held on the clamping frame by way of one of studs and holding nuts, and rivets.

4. Device according to claim 2, wherein the corner clamping pieces are held on the clamping frame by way of one of studs and holding nuts, and rivets.

5. A roof assembly for a passenger vehicle comprising:
    a molded ceiling element,
    a roof cutout for a sliding roof in said ceiling element,
    a ceiling covering disposed on a side of the ceiling element which in use faces a passenger space, said ceiling element being attachable to a vehicle roof, said ceiling covering being pulled around an upright edge surrounding the roof cutout and being glued to the upright edge, and
    at least one corner clamping piece for fastening the ceiling covering to the molded ceiling element at a respective rounded corner of the roof cutout,
    wherein the at least one corner clamping piece is formed as an angle profile with an upright leg, which at least one corner clamping piece clamps the ceiling covering to a facing portion of the upright edge surrounding the roof cutout,
    wherein the at least one corner clamping piece is connected with the ceiling element by a clamping frame fastened thereto,
    wherein the ceiling covering is held over the upright leg of the angle profile and on an exterior side of the upright edge surrounding the roof cutout,
    wherein the upright leg has prongs facing a portion of the upright edge surrounding the roof cutout and holding the covering so that the covering follows in the contacting manner a course of a rounded corner area of the roof cutout, and
    wherein the clamping frame comprises several bendable fastening lugs which are arranged to correspond with slots of the at least one corner clamping piece.

6. A roof assembly according to claim 5, wherein said at least one corner clamping piece is one of four corner clamping pieces provided at respective rounded corners of the roof cutout.

7. A roof assembly according to claim 6, wherein a straight clamping piece is arranged at least on a straight-extending edge area of the cutout, and, at the rounded corners of the roof cutout, the corner clamping pieces approximately form quarter circles.

8. A roof assembly for a passenger vehicle comprising:
    a molded ceiling element,
    a roof cutout for a sliding roof in said ceiling element,
    a ceiling covering disposed on a side of the ceiling element which in use faces a passenger space, said ceiling element being attachable to a vehicle roof, said ceiling covering being pulled around an upright edge surrounding the roof cutout and being glued to the upright edge, and
    at least one corner clamping piece for fastening the ceiling covering to the molded ceiling element at a respective rounded corner of the roof cutout,
    wherein the at least one corner clamping piece is formed as an angle profile with an upright leg, which at least one corner clamping piece clamps the ceiling covering to a facing portion of the upright edge surrounding the roof cutout,
    wherein the at least one corner clamping piece is connected with the ceiling element by a clamping frame fastened thereto,
    wherein the ceiling covering is held over the upright leg and on an exterior side of the upright edge surrounding the roof cutout,
    wherein the upright leg has prongs facing a portion of the upright edge surrounding the roof cutout and holding the covering so that the covering follows in a contacting manner a course of a rounded corner area of the roof cutout, and wherein the corner clamping pieces are held on the clamping frame by way of one of studs and holding nuts, and rivets.

9. A roof assembly according to claim 5, wherein said at least one corner clamping piece is a sheet metal member.

10. A roof assembly according to claim 5, wherein said ceiling covering is made of one of leather and imitation leather.

* * * * *